(12) United States Patent
Bajpai et al.

(10) Patent No.: US 9,766,902 B2
(45) Date of Patent: *Sep. 19, 2017

(54) RE-ENUMERATION OF USB 3.0 COMPATIBLE DEVICES

(71) Applicant: Cypress Semiconductor Corporation, San Jose, CA (US)

(72) Inventors: Pradeep Bajpai, Sunnyvale, CA (US); Robert Rundell, Kirkland, WA (US); Syed Babar Raza, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,809

(22) Filed: Sep. 19, 2014

(65) Prior Publication Data
US 2015/0100707 A1 Apr. 9, 2015

Related U.S. Application Data

(63) Continuation of application No. 13/632,084, filed on Sep. 30, 2012, now Pat. No. 8,843,664, which is a
(Continued)

(51) Int. Cl.
*G06F 9/44* (2006.01)
*G06F 9/445* (2006.01)
(Continued)

(52) U.S. Cl.
CPC .......... *G06F 9/4415* (2013.01); *G06F 1/3293* (2013.01); *G06F 3/00* (2013.01);
(Continued)

(58) Field of Classification Search
CPC ........................................ G06F 8/65
(Continued)

(56) References Cited

U.S. PATENT DOCUMENTS 6,647,452 B1 11/2003 Sonoda
6,738,834 B1 5/2004 Williams et al.
(Continued)

FOREIGN PATENT DOCUMENTS

CN 101246428 A 8/2008
CN 102272723 A 12/2011
(Continued)

OTHER PUBLICATIONS

Hewlett-Packard et al. Universal Serial Bus 3.0 Specification, Jun. 6, 2011 Revision 1.0. pp. 6-(33-34), 7-(13, 20-21, 36). The full document is available on http://www.usb.org/developers/docs/.*
(Continued)

*Primary Examiner* — Henry Tsai
*Assistant Examiner* — John Roche

(57) ABSTRACT

A host device can download a firmware update to a peripheral device having previously enumerated with the host device. The host device can perform link training with the peripheral device in response to a re-enumeration indication received from the peripheral device. The link training can include switching a Link Training and Status State Machine (LTSSM) in the host device from an active state (U0) to an RX.Detect state and synchronizing with the peripheral device in the RX.Detect state. The host device can re-enumerate with the peripheral device utilizing the firmware update after the host device completes link training with the peripheral device.

18 Claims, 8 Drawing Sheets

Related U.S. Application Data continuation-in-part of application No. 13/248,326, filed on Sep. 29, 2011, now Pat. No. 8,996,747.

(51) Int. Cl.
| | |
|---|---|
| *G06F 3/00* | (2006.01) |
| *G06F 1/32* | (2006.01) |
| *G06F 11/30* | (2006.01) |
| *G06F 13/42* | (2006.01) |

(52) U.S. Cl.
CPC ............... *G06F 8/65* (2013.01); *G06F 8/665* (2013.01); *G06F 9/4411* (2013.01); *G06F 11/3051* (2013.01); *G06F 13/4286* (2013.01); *Y02B 60/183* (2013.01)

(58) Field of Classification Search
USPC .......................................................... 710/10
See application file for complete search history.

(56) References Cited

U.S. PATENT DOCUMENTS

| | | | |
|---|---|---|---|
| 6,839,778 B1* | 1/2005 | Sartore et al. ................. | 710/60 |
| 7,500,027 B2 | 3/2009 | Wu | |
| 7,694,032 B2 | 4/2010 | Lim et al. | |
| 7,707,323 B2 | 4/2010 | Matton et al. | |
| 7,711,863 B2* | 5/2010 | Matton et al. ................. | 710/8 |
| 7,752,029 B2 | 7/2010 | Tamayo et al. | |
| 7,908,335 B1 | 3/2011 | Citterelle et al. | |
| 8,028,040 B1 | 9/2011 | Hobbs et al. | |
| 8,041,866 B2 | 10/2011 | Barake et al. | |
| 8,171,502 B2 | 5/2012 | Mullis, II et al. | |
| 8,176,227 B2 | 5/2012 | Devam et al. | |
| 8,219,729 B1 | 7/2012 | Wright | |
| 8,843,664 B2 | 9/2014 | Bajpai et al. | |
| 8,996,747 B2 | 3/2015 | Bajpai et al. | |
| 9,122,288 B1 | 9/2015 | Nayak et al. | |
| 2004/0083302 A1 | 4/2004 | Thornton | |
| 2006/0064513 A1* | 3/2006 | Creigh ............................. | 710/11 |
| 2007/0115831 A1 | 5/2007 | Sharma et al. | |
| 2008/0054855 A1* | 3/2008 | Hussain et al. ............... | 320/162 |
| 2008/0126573 A1 | 5/2008 | Matton et al. | |
| 2008/0195765 A1 | 8/2008 | Xie et al. | |
| 2008/0263243 A1 | 10/2008 | Wright et al. | |
| 2009/0222685 A1 | 9/2009 | Foster et al. | |
| 2009/0271533 A1 | 10/2009 | Asnaashari | |
| 2010/0093401 A1* | 4/2010 | Moran et al. ................. | 455/566 |
| 2010/0122021 A1 | 5/2010 | Lee et al. | |
| 2010/0180051 A1 | 7/2010 | Harris | |
| 2010/0180138 A1* | 7/2010 | Yen et al. ..................... | 713/324 |
| 2010/0185808 A1 | 7/2010 | Yu et al. | |
| 2010/0223402 A1 | 9/2010 | Chen | |
| 2010/0275037 A1 | 10/2010 | Lee et al. | |
| 2010/0312929 A1* | 12/2010 | Liu et al. ...................... | 710/63 |
| 2010/0328493 A1 | 12/2010 | Hanlon et al. | |
| 2011/0066266 A1 | 3/2011 | Nakano | |
| 2011/0093633 A1 | 4/2011 | Solomon et al. | |
| 2011/0106989 A1 | 5/2011 | Solomon et al. | |
| 2011/0113079 A1 | 5/2011 | Jou et al. | |
| 2011/0126005 A1 | 5/2011 | Carpenter et al. | |
| 2011/0161530 A1 | 6/2011 | Pietri et al. | |
| 2011/0179201 A1 | 7/2011 | Monks et al. | |
| 2012/0008938 A1 | 1/2012 | Tang et al. | |
| 2012/0020404 A1 | 1/2012 | Hsieh et al. | |
| 2012/0023318 A1 | 1/2012 | Xing et al. | |
| 2012/0102244 A1 | 4/2012 | Shiraishi | |
| 2012/0311122 A1 | 12/2012 | Johnsen et al. | |
| 2013/0086282 A1 | 4/2013 | Bajpai et al. | |
| 2013/0132614 A1 | 5/2013 | Bajpai et al. | |
| 2015/0100707 A1 | 4/2015 | Bajpai et al. | |

FOREIGN PATENT DOCUMENTS

| | | | |
|---|---|---|---|
| CN | 103314365 A | | 9/2013 |
| EP | 2372565 A1 | | 10/2011 |
| WO | 9901820 A | | 1/1999 |
| WO | 2010088567 A1 | | 8/2010 |
| WO | 2010132944 A1 | | 11/2010 |

OTHER PUBLICATIONS

U.S. Appl. No. 13/248,326: "Methods and Physical Computer-Readable Storage Media for Initiating Re-Enumeration of USB 3.0 Compatible Devices," Pradeep Bajpai, filed Sep. 29, 2011; 20 pages.

U.S. Appl. No. 13/632,084: "Re-Enumeration of USB 3.0 Compatible Devices" Pradeep Kumar Bajpai et al., filed Sep. 30, 2012; 49 pages.

International Search Report for International Application No. PCT/US11/54241 dated Oct. 18, 2012; 3 pages.

International Search Report for International Application No. PCT/US2012/072204 mailed Mar. 8, 2013; 2 pages.

USB 3.0 Connection Exerciser; online Sep. 2012; http://www.mcci-jp.com/devtools/exerciser.html; MCCI product page; 3 pages.

USB Background—Knowledge Base—Article 10047—Total Phase, Inc., Jun. 17, 2012, pp. 1-16. Retrieved from the internet <URL:http://web.archive.org/web/20120617132016/http://www.totalphase.com/support/kb/10047/>.

USB Device Disconnect-On-Demand with uPSD32xx; online http://www.icbase.com/pdf/STM/STM30020501.pdf; STMicroelectronics; copyright 2004; 11 Pages.

USPTO Advisory Action for U.S. Appl. No. 13/248,326 dated Oct. 1, 2013; 3 pages.

USPTO Advisory Action for U.S. Appl. No. 13/632,084 dated Sep. 8, 2014; 3 pages.

USPTO Advisory Action for U.S. Appl. No. 13/632,084 dated Aug. 2, 2013; 3 pages.

USPTO Final Rejection for U.S. Appl. No. 13/248,326 dated Jun. 10, 2014; 19 pages.

USPTO Final Rejection for U.S. Appl. No. 13/248,326 dated Jul. 18, 2013; 17 pages.

USPTO Final Rejection for U.S. Appl. No. 13/632,084 dated Mar. 24, 2014; 11 pages.

USPTO Final Rejection for U.S. Appl. No. 13/632,084 dated Jun. 24, 2013; 18 pages.

USPTO Non-Final Rejection for U.S. Appl. No. 13/248,326 dated Jan. 31, 2013; 17 pages.

USPTO Non-Final Rejection for U.S. Appl. No. 13/248,326 dated Oct. 3, 2014; 23 pages.

USPTO Non-Final Rejection for U.S. Appl. No. 13/248,326 dated Nov. 7, 2013; 17 pages.

USPTO Non-Final Rejection for U.S. Appl. No. 13/632,084 dated Jan. 29, 2013; 16 pages.

USPTO Non-Final Rejection for U.S. Appl. No. 13/632,084 dated Oct. 24, 2013; 20 pages.

USPTO Notice of Allowance for U.S. Appl. No. 13/248,326 dated Jan. 14, 2015; 8 pages.

USPTO Notice of Allowance for U.S. Appl. No. 13/632,084 dated May 15, 2014; 10 pages.

USPTO Notice of Allowance for U.S. Appl. No. 13/632,084 dated Jun. 24, 2014; 8 pages.

Written Opinion of the International Searching Aurhority for International Application No. PCT/US2012/072204 mailed Mar. 8, 2013; 3 pages.

Written Opinion of the International Searching Authority for International Application No. PCT/US11/54241 dated Oct. 18, 2012; 5 pages.

U.S. Appl. No. 14/675,128: "Methods and Physical Computer-Readable Storage Media for Initiating Re-Enumeration of USB 3.0 Compatible Devices," Pradeep Bajpai et al., filed Mar. 31, 2015; 19 pages.

Hewlett-Packard et al. Universal Serial Bus 3.0 Specification, Jun. 6, 2011 Revision 1.0, pp. 1-3, 3-6, 6-34, and 7-13. The full document is available at http://www.usb.org/developers/docs/.

USPTO Non-Final Rejection for U.S. Appl. No. 14/675,128 dated Jul. 16, 2015, 39 pages.

(56) References Cited

OTHER PUBLICATIONS

USPTO Notice of Allowance for U.S. Appl. No. 13/248,326 dated Feb. 20, 2015; 2 pages.
EPO Supplementary European Search Report for International Application EP12885458 dated Mar. 21, 2016; 6 pages.
Patent Office communication for International Application EP12885458 dated Oct. 15, 2016; 1 page.
SIPO Office Action for Application No. 201180002764.9 dated Jul. 18, 2016; 6 pages.
Universal Serial Bus 3.0 Specification, Nov. 12, 2008 (Nov. 12, 2008): URL:http//www.usb.org/developers/docs/, retrieved on [Jan. 20, 2009].
USPTO Final Rejection for U.S. Appl. No. 14/675,128 dated Dec. 18, 2015; 8 pages.
USPTO Notice of Allowance for U.S. Appl. No. 14/675,128 dated Mar. 17, 2016; 13 pages.
USPTO Notice of Allowance for U.S. Appl. No. 14/675,128 dated Sep. 26, 2016; 9 pages.
USPTO Notice of Allowance for U.S. Appl. No. 14/675,128 dated Jun. 6, 2016; 9 pages.
EPO Search Report for European Application No. 11873082 dated Sep. 24, 2015; 4 pages.
EPO Search Report for European Application No. 12885458.5 dated Dec. 8, 2016; 3 pages.
SIPO Office Action for Application No. 201180002764.9 dated Dec. 30, 2016; 5 pages.
SIPO Office Action for Chinese Application No. 2012800740151 dated Dec. 23, 2016; 9 pages.
USPTO Non-Final Rejection for U.S. Appl. No. 15/277,529 dated Oct. 21, 2016, 10 pages.
USPTO Notice of Allowance for U.S. Appl. No. 14/675,128 dated Jan. 19, 2017; 8 pages.
SIPO Office Action for Application No. 201180002764.9 dated May 9, 2017.
USPTO Final Rejection for U.S. Appl. No. 15/277,529 dated Apr. 20, 2017; 11 pages.
USPTO Notice of Allowance for U.S. Appl. No. 14/675,128 dated Apr. 28, 2017; 10 pages.
USPTO Notice of Allowance for U.S. Appl. No. 15/277,529 dated May 19, 2017; 12 pages.
EPO Office Action for European Application No. 12885458.5 dated Jul. 21, 2017; 3 pages.

\* cited by examiner

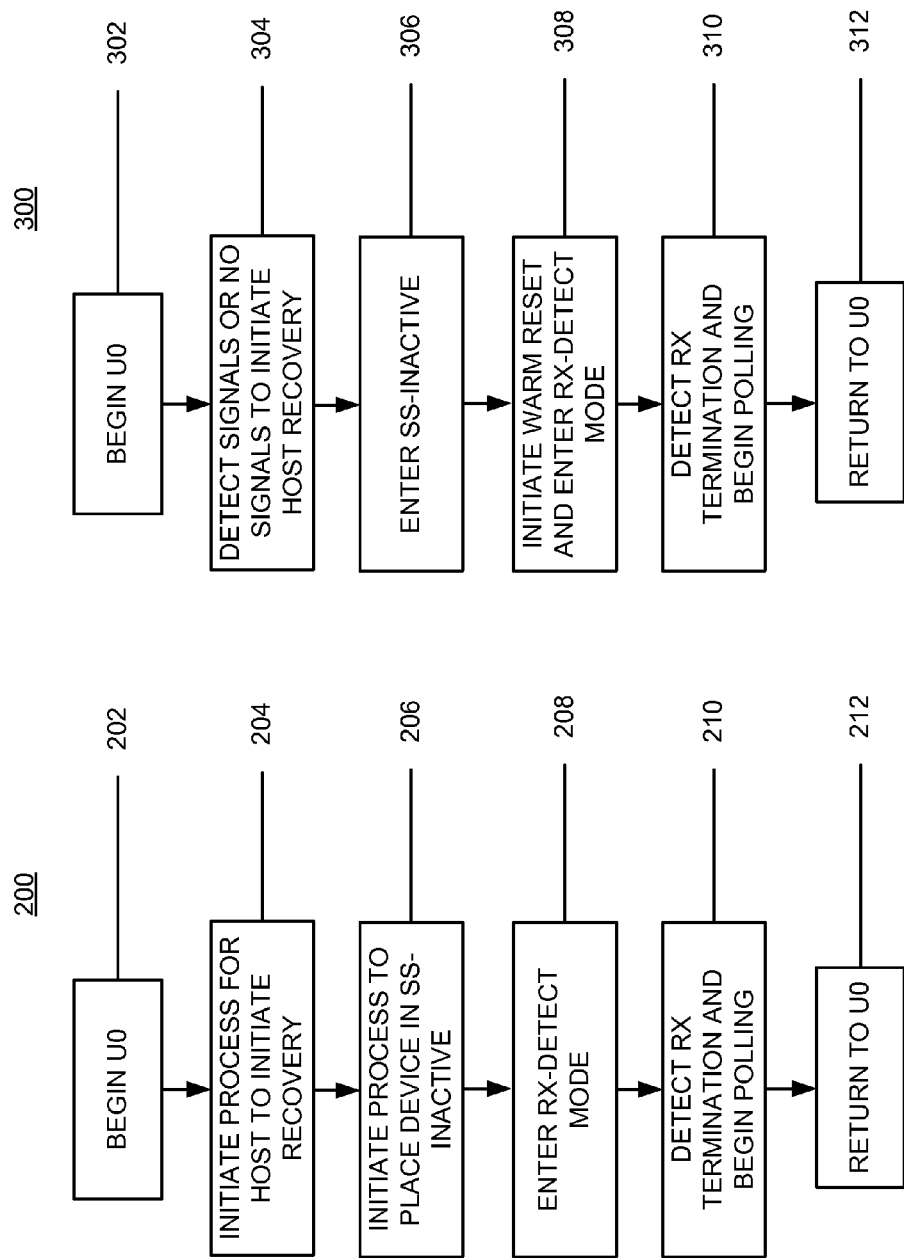

RE-ENUMERATION OF USB 3.0 COMPATIBLE DEVICES

RELATED APPLICATION

This application is a continuation of U.S. patent application Ser. No. 13/632,084, filed Sep. 30, 2012, which is a continuation-in-part of U.S. patent application Ser. No. 13/248,326, filed Sep. 29, 2011, all of which are incorporated by reference herein in their entirety.

TECHNICAL FIELD

This disclosure relates to the field of universal serial buses (USBs) and, in particular, to re-enumeration of a device compatible with USB 3.0.

BACKGROUND

The Universal Serial Bus (USB) standard provides a universal interface for a Personal Computer (PC) that includes universal plug-and-play and relative ease-of-use. Specifically, when a USB peripheral device is plugged-in to a USB port on a PC, the system will auto-detect and auto-configure the peripheral device. The USB peripheral devices may include devices such as printers, scanners, keyboards, a mouse, joysticks, digital cameras, digital video cameras, data acquisition devices, modems, speakers, telephones or video phones, storage devices such as ZIP drives, or any other peripheral or computing device.

In most cases, there is zero user intervention. The USB interface also eliminates the need for multiple input/output (I/O) standards to peripheral devices, thereby simplifying PC connectivity for the consumer as well as simplifying manufacturing for the PC Original Equipment Manufacturers (OEMs).

The original USB specification has evolved over time to meet the needs of industry, resulting in three versions available today. The first two versions, USB 1.0 (later revised to USB 1.1) and USB 2.0, respectively, are wired interfaces, as they use a cable between a host (for example a personal computer or PC) and the USB peripheral device. Although the USB 1.1 has a top transmission speed of 12 million bits/second (Mb/s), system performance may become sluggish if multiple multimedia devices are attached to one USB 1.1 port. USB 2.0 transmission speed is increased to 480 mega bits/second but maintains backwards compatibility to the full speed (12 Mb/s) and low speed (1.5 Mb/s) devices defined in the USB 1.1 specification. USB 3.0 has transmission speeds of up to 5 gigabits/second and has downward compatibility to USB 2.0 devices.

Although USB 3.0 provides many improvements over previous USB versions, facets of its implementation may not be explicitly defined and may be improved and/or extended. For example, at present, there is no specification-compliant method in existence to perform re-enumeration.

DESCRIPTION OF THE DRAWINGS

FIG. 2 is a flow diagram of a method of inducing a host to perform re-enumeration on a device, according to an embodiment.

FIG. 3 is a flow diagram of a method of performing re-enumeration of a device by a host, according to an embodiment.

DETAILED DESCRIPTION

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. The following detailed description is not to be taken in a limiting sense as the scope of the subject matter to be patented is defined by the appended claims and their equivalents.

This application discloses re-enumeration by a host device of a USB 3.0 compatible peripheral device or Superspeed USB peripheral device. This re-enumeration can follow a change in status of the host, for example, when the host has downloaded a firmware update for the peripheral device or when the host wishes to allow the peripheral to select a different class or configuration for the peripheral device. In these situations, the host device can issue a vendor command to prompt the peripheral device to initiate re-enumeration of the peripheral by the host device, and allow reconfiguration of the peripheral device using the firmware update or perform a change to a new class or configuration after initiation of the re-enumeration process by the peripheral device in response to a vendor command. The re-enumeration process also can be peripheral device initiated, for example, when the peripheral device adds a new function through an interface port, wishes to change a service class, or wants to switch between self-powered and bus-powered modes. Embodiments of various re-enumeration applications will be described below in greater detail.

Figure 1:
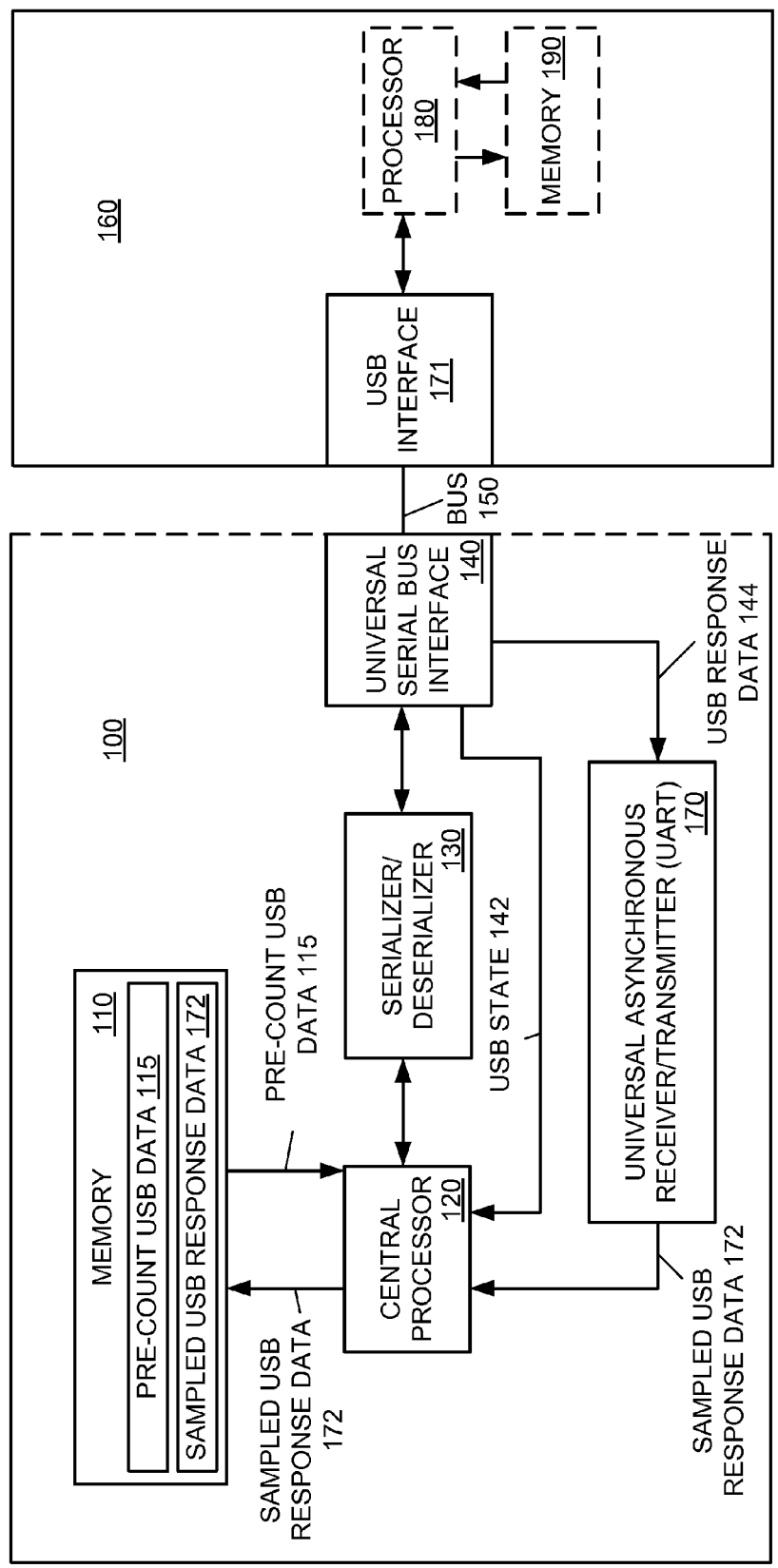
FIG. 1 is a block diagram of a universal serial bus (USB) host system connected to a device, according to an embodiment.

FIG. 1 is a block diagram of a universal serial bus (USB) host system 100 connected to a device 160, according to an embodiment. The USB host system 100 is coupled to the device 160 via a bus 150. The bus 150 may include a USB cable, PCB traces, or other electrical physical connections. In other embodiments, the bus 150 and device 160 are configured to comply with USB 3.0 standards delineated in Universal Serial Bus 3.0 Specification, revision 1.0, Nov. 12, 2008, which may also be found at http://www.usb.org/developers/docs.

The USB host system 100 includes a central processor 120 to control the communication with the device 160 for the USB host system 100. For instance, the central processor 120 may direct the USB host system 100 to issue requests over the bus 150, synchronize with incoming data from the bus 150 by tracking synchronization bits in the incoming data, decode the incoming data, determine whether the incoming data was received correctly, and respond to the incoming data when necessary. In an embodiment, the central processor 120 is a programmed processor (e.g., a central processing unit), hard-wired, or fixed-function logic. In other embodiments, the central processor 120 has a different configuration.

The USB host system 100 may be a reduced functionality USB host controller, capable of performing a set of one or more preprogrammed functions from the USB specification. For instance, when the USB host system 100 is incorporated into a host device, such as a battery charger, the USB host system 100 may include functionality that allows the host device to charge the battery of a device 160 (such as a cellphone, personal digital assistant, digital cameras, digital video cameras, and the like) via the bus 150. In another example, the USB host system 100 may include functionality that allows the host device to communicate commands to begin operation of a device 160 (such as a printer, a camera, a mouse, printers, scanners, keyboards, joysticks, data acquisition devices, modems, speakers, telephones or video phones, storage devices such as ZIP drives or another peripheral device).

The USB host system 100 includes a memory 110 to store USB data 115 for use in transmissions over the bus 150 to the device 160. This USB data 115 may be generated and stored in memory 110 by the central processor 120 or by another device internal to or external from the USB host system 100. The USB data 115 may have a format that allows the USB host system 100 to transfer the USB data 115 from the memory 110 to the bus 150 without having to perform alterations on the USB data 115.

The USB host system 100 includes a USB physical interface 140 to couple to the bus 150. The USB interface 140 may identify when a device (e.g., device 160) is coupled to the USB host system 100 via the bus 150 and provide a USB state 142 to the central processor 120 that indicates the device 160 is coupled to the USB host system 100 via the bus 150. The bus 150 may have 2 states: a J state and a K state. The USB interface 140 may identify when a device 160 is coupled to the USB host system 100 according to the presence of one of these USB states, or from transitions in the USB states.

The central processor 120 may receive USB data 115 from the memory 110, e.g., responsive to the USB state 142, and direct the USB host system 100 to provide the USB data 115 on the bus 150. In some embodiments, the USB data 115 may be a request for the device 160, or may be an acknowledgement of USB response data 144 received from the device 160. The USB data 115 may be a complete bit sequence or substantially complete bit sequence that is available for transmission over the bus 150. For instance, when the USB data 115 is a complete bit sequence, the USB host system 100 may directly retrieve the USB data 115 from memory 110 and send it over the bus 150 without having to perform additional processing on the data. When the USB data 115 is a substantially complete bit sequence, the USB host system 100 may directly retrieve the USB data 115 from memory 110 and send it over the bus 150 with little additional processing, such as appending a preamble, etc.

The USB host system 100 includes a serializer/deserializer 130 to perform serialization operations on outgoing data and deserialization operations on data incoming from the bus 150. The USB host system 100 may also include a universal asynchronous receiver and transmitter (UART) 170 to sample USB response data 144 from the device 160. In some embodiments, the central processor 120 or other device in the USB host system 100 may sample USB response data 144 from the device 160. The UART 170 may over-sample the USB response data 144, for example using a 4 times over-sampling process, to recover the response and to generate sampled USB response data 172. The UART 170 may provide the sampled USB response data 172 to the central processor 120 via the serializer/deserializer 130 for storage and processing.

When the central processor 120 receives the USB state 142 indicating that the USB peripheral device 160 is coupled to the USB host system 100, the central processor 120 may retrieve a pre-generated Get_Device_Descriptor request, which is a standard USB request, from the memory 110. Once the pre-generated Get_Device_Descriptor request is provided to the device 160 over the bus 150, the device 160 may generate a response to the pre-generated Get_Device_Descriptor request. The response may include a descriptor that describes the type of device coupled to the USB host system 100 via the bus 150.

The USB host system 100 may receive the response at the USB interface 140 as USB response data 144 and provide the USB response data 144 to the UART 170. The UART 170 may sample the USB response data 144 and provide the sampled USB response data 172 to the central processor 120 via the serializer/deserializer 130 for storage and/or processing. In some embodiments, the UART 170 may over-sample the USB response data 144, for example, using a 4 times over-sampling process, to generate sampled USB response data 172.

The central processor 120 may direct the USB host system 100 to provide an acknowledgement to the response from the device 160. The acknowledgement may be stored in the memory 110 as pre-generated USB data 115, which is retrieved responsive to the reception of the response from the device 160. In some embodiments, the acknowledgement is sent to the device 160 over the bus 150 prior to the central processor 120 parsing the response to identify the descriptor.

The central processor 120 may store the sampled USB response data 172 in the memory 110, and then subsequently retrieve the sampled USB response data 172 for processing. The central processor 120 may parse the sampled USB response data 172 to determine whether the USB response data 144 was correctly received by the USB host system 100. For instance, the central processor 120 may perform a cyclical redundancy check (CRC) and compare the results of the CRC to the contents of a CRC field in the USB response data 144.

As delineated in the USB 3.0 protocol, a USB 3.0 compatible USB host system 100 is configured to detect the device 160 at least twice when connected. Repetitive detection allows the USB host system 100 to perform re-enumeration of the device 160 to thereby obtain any updated device configuration data.

The device 160 may comprise a USB peripheral device and include a USB interface 171. The USB interface 171 may indicate when the device 160 is coupled to the USB host system 100 via the bus 150 and provide a USB state that indicates the device 160 is coupled to the USB host system 100 via the bus 150.

Depending on the particular configuration and purpose, the device 160 may include various components for carrying out the operation of the device 160. For example, the device may be an input device, such as a keyboard, pointing device (e.g., mouse, light pen, joystick, touch screen, gaming devices, and the like), imaging device (e.g., a webcam, videocam, scanner, and the like), or an audio device (e.g., microphone) for providing data and control signals to a host system 100 via a device processor 180. Thus, the input device may include buttons, cameras, optical readers, or other components in communication with the device processor 180.

In another example, the device 160 may be an output device that delivers an output to a user resulting from processing completed by the host system 100. For example, the output device may include speakers, headphones, video screen, and the like and may include operational components associated with such devices. Those operational components may be in communication with the device processor 180, in an embodiment.

In other embodiments, the device 160 includes a memory 190, which may include software stored therein for processes that present device configuration data to the USB host system 100 to thereby allow the USB host system 100 to identify the device 160.

Although the processor 180 and memory 190 are depicted in phantom, it will be appreciated that one or both components may be included in the device 160. In other embodiments, additional components, including but not limited to those described above, may also be included as part of the device 160.

When a host (e.g., host system 100) is connected to a device (e.g., device 160), the host reads descriptors to determine the capabilities of the device to thereby allow drivers to be loaded onto the device. In this regard, the host performs an enumeration protocol on the device. If the configuration descriptors of the device needs to changed or has been previously changed, the host performs re-enumeration of the device. To induce the host into performing re-enumeration of the device, the device transmits an indicator to the host to cause a host Link Training and Status State Machine (LTSSM) to move from active state (U0) to one of SS.Inactive and RX.Detect. In an embodiment, the host LTSSM moves to RX. Detect after SS.Inactive. In any case, after RX.Detect, the host LTSSM continues to polling and then to U0.

Several methods may be used to induce the host to perform re-enumeration. FIG. 2 is a flow diagram of a method 200 of inducing a host to perform re-enumeration on a device, according to an embodiment. The device begins a U0 state, step 202. For example, the device (e.g., device 160) enters a U0 link state, which indicates that the device is active. In the U0 state, a connection between the device and host (e.g, host system 100) may be established as a default configuration.

Next, the device initiates performance of a process for the host to initiate recovery, step 204. In some embodiments, the device can simulate a bus error state, which can prompt the host 100 to initiate link training with the device and re-enumeration of the device. Alternatively, the device may simulate a disconnection and reconnection, or may simulate a failure to come out of a sleep mode, or otherwise cause the host to re-enumerate the peripheral device without manual intervention by the user. For example, the device may provide error messages to the host, such as by stopping LUP transmission if the USB (e.g., bus 150) is IDLE. In another embodiment, the device may provide error messages that stop LGOOD and LCRD transmissions to cause timeout at a link layer of the host or that include a corrupt sequence number on LGOOD, LCRD, or on a header packet. In still yet another embodiment, the instructions may cause the device to engage in a successful LFPS exit handshake from a low power state (e.g., U1, U2, or U3) to recovery or during the handshake may respond with an improper LFPS. In still yet another embodiment, the device may perform steps which cause the host 100 to re-enumerate the device 160 without the host 100 having detected any error. Although FIGS. 1 and 2 discuss a device 160 inducing the host 100 to engage in a re-enumeration process, by link training or re-synching during a warm reset and then receiving configuration of the device 160, in some embodiments, the host device 100 can be induced to perform the re-enumeration process with device 160 through any prompting internal or external to the host device 100.

In any case, the firmware initiates a process to place the device into an SS.Inactive mode, step 206. As a result, the device receives a signal indicating that a warm reset has been performed by the host. After the warm reset signal is received, the device enters an RX.Detect mode, step 208. At this point, the device resets. Additionally, the device and the host, which is also in an RX.Detect mode, synchronize. After the device and host are synchronized, the device detects RX termination from the host and begins polling, step 210. Training completes after polling and the device returns to a U0 state, step 212. At the U0 state, the device and the host re-establish a connection, and the device presents a new configuration to the device in the course of being enumerated by the host 100. Specifically, in one example, the device (e.g., device 160) may receive a Get_Device_Descriptor request from the host 100 over the bus 150 and may generate a response to the Get_Device_Descriptor request. The response may include a descriptor that describes the type of device coupled to the host 100 via the bus 150. Alternatively, or in addition, the host 100 may issue one of the other Get_Descriptor requests defined by the USB Specification.

FIG. 3 is a flow diagram of a method 300 of performing re-enumeration of a device by a host, according to an embodiment. Some of the steps of method 300 may occur substantially simultaneously with those of method 200. The host begins a U0 state, step 302. When the host is in U0 state, it may be connected with the device. For example, a bus (e.g., bus 150) connects a USB physical interface (e.g., USB physical interface 140) of the host (e.g., host system 100 to a USB physical interface (e.g., USB physical interface 171) of the device (e.g., device 160).

In some embodiments, the device can simulate a disconnection and reconnection to the bus 150, and/or simulate a bus error state, which can prompt the host 100 to initiate link training with the device and re-enumeration of the device. The host receives an indication from the device, such as the simulated error on the bus 150, which causes the host to initiate recovery, step 304. Specifically, the indications include, but are not limited to those described above in conjunction with step 204 of method 200 in FIG. 2. As noted in the above description, in some embodiments, the host enters a low power state (e.g., U1, U2, or U3) after U0 and prior to entry into recovery. After recovery, the host enters an SS.Inactive mode, step 306. In an embodiment, the host enters a hot reset prior to moving to SS.Inactive. In another embodiment, the host enters loopback prior to moving to SS.Inactive. Subsequently, the host initiates a warm reset and enters an RX.Detect mode, step 308. Although FIGS. 1 and 3 discuss a device 160 inducing the host 100 to engage in a re-enumeration process, by link training or re-synching during a warm reset and then receiving configuration of the device 160, in some embodiments, the host device 100 can be induced to perform the re-enumeration process with device 160 through any prompting internal or external to the host device 100.

In other embodiments of the method 300, step 304 is omitted. For example, the host Link Training and Status State Machine (LTSSM) may respond to the device by moving from U0 to U1, U2 or U3 to SS.Inactive mode. In another embodiment, step 306 is omitted and the host moves from U0 to recovery to loopback to RX.Detect mode. In any case, during the RX.Detect mode, the host enters warm reset, and the host and the device synchronize.

After the host and device are synchronized, the host detects RX termination from the device and begins polling, step 310. Training completes after polling and the host returns to a U0 state, step 312. Subsequently, the host receives a new configuration from the device to begin re-enumeration on the device. For example, a central processor (e.g., central processor 120 of the host 100 in FIG. 1) may retrieve a pre-generated Get_Device_Descriptor request, which is a standard USB request, from a memory (e.g., memory 110 of FIG. 1) causing the host to retrieve the new device configurations.

By manipulating link connectivity and link power management (e.g., via the link training and status state machine (LTSSM)), the device simulates disconnect and/or connect between the device and host. As a result, a USB 3.0 host and USB 3.0 device may reconnect with each other and the device may be recognized as a new device. Accordingly, re-enumeration of the device may be performed by the host.

Figure 4A:
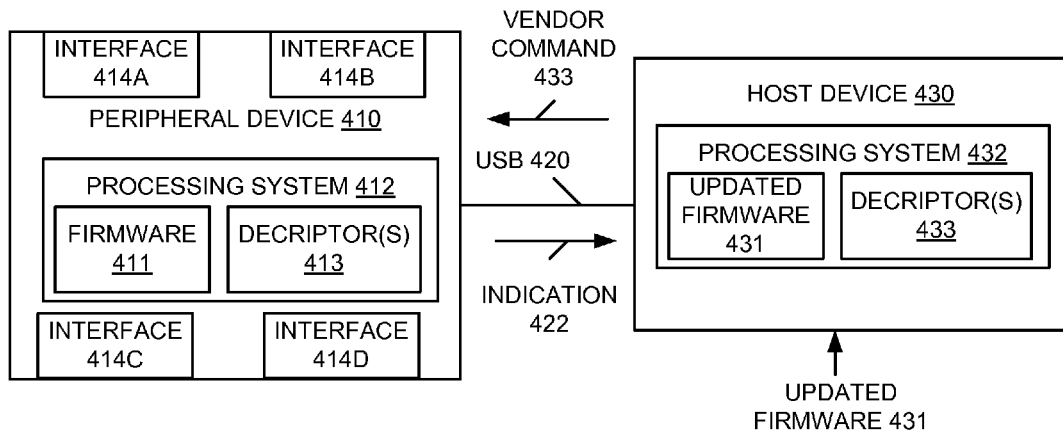
FIG. 4A is block diagram example of a system with a host device having updated firmware for a peripheral device.

FIG. 4A is block diagram example of a system with a host device 430 having updated firmware 431 for a peripheral device 410. Referring to FIG. 4A, a peripheral device 410 can be coupled to a host device 430 via a universal serial bus (USB) 420. In some embodiments, the peripheral device 410, the USB 420, the host device 430 can comply with USB 3.0 standards delineated in Universal Serial Bus 3.0 Specification, revision 1.0, Nov. 12, 2008 and/or a subsequent later revision.

The peripheral device 410 can include a processing system 412, which can include at least one memory device and at least one processor capable of implementing the USB 3.0 specification and perform other operations based on firmware 411. The peripheral device 430 can receive the firmware 411 from the host device 430 after enumeration between the host device 430 and the peripheral device 410.

The processing system 412 can store at least one descriptor 413 that includes configuration information of the peripheral device 410. For example, the descriptor 413 can include an endpoint configuration of the peripheral device 410, such as endpoint types, a number of endpoints supported, etc. The descriptor 413 also can include a memory configuration of the peripheral device 410, such as a memory size, and maximum packet length, etc. The descriptor 413 also can include a description of a USB class supported by the peripheral device 410. In some embodiments, the peripheral device 410 can support multiple different classes and/or configurations identified through different descriptors 413. The peripheral device 410 can include one or more interfaces 414A-414D, such as a port or other device capable of coupling to or communicating with functional devices, such as memory cards, storage devices, modems, etc.

The host device 430 can include a processing system 432, which can include at least one memory device and at least one processor capable of implementing the USB 3.0 specification and perform other operations. The processing system 432 can include descriptors 433 of the peripheral device 410. In some embodiments, during an enumeration between the peripheral device 410 and the host device 430, the host device 430 can receive at least one descriptor 413 from the peripheral device 410 and stored configuration information as descriptor 433. The peripheral device 410 can include descriptors other than the descriptor 433 provided to the host device 430 during enumeration.

The host device 430 can receive updated firmware 431 for the peripheral device 410, for example, over a network or other connection or media. The host device 430 can download the updated firmware 431 to the peripheral device 410 and then prompt the peripheral device 410 to initiate re-enumeration of the peripheral device 410 by the host device 430. In some embodiments, the host device 430 can issue a vendor command 433 over the USB 420 to the peripheral device 410 that prompts the peripheral device 410 to induce the host device 430 to re-enumerate with the peripheral device 410, for example, by sending an indication 422 to the host device 430. In one embodiment, the indication 422 may comprise a simulated bus error condition. Embodiments of peripheral device firmware updating by the host device will be described below with reference to FIG. 4B.

Figure 4B:
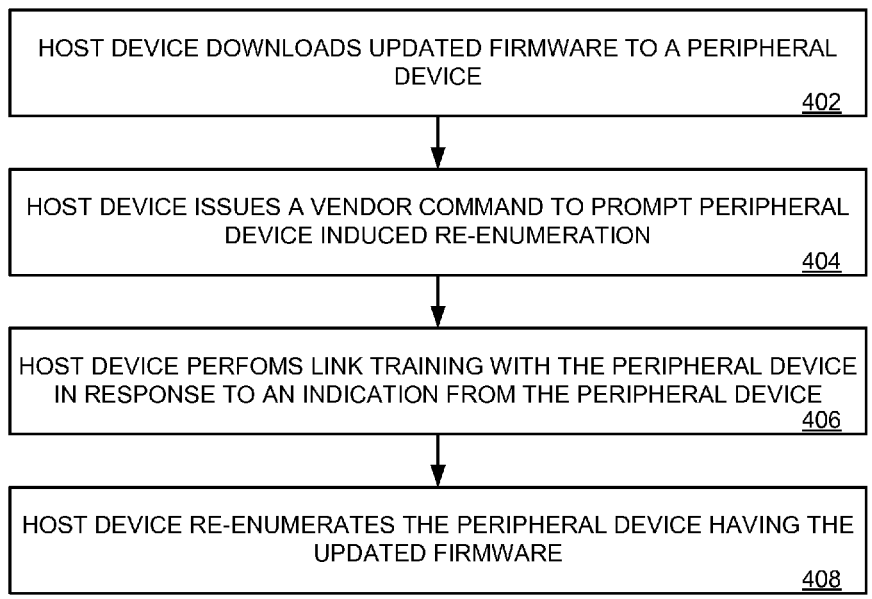
FIG. 4B is an example operational flowchart for re-enumeration by a host device of a peripheral device as part of updating firmware of the peripheral device.

FIG. 4B is an example operational flowchart for re-enumeration by the host device 430 based on available updated firmware 431 for the peripheral device 410. Referring to FIG. 4B, at a block 402, the host device 430 can download updated firmware 431 to the peripheral device 410, for example, after the host device 430 initially synchronized with the peripheral device 410 and performed enumeration.

The host device 430 can receive updated firmware 431 for the peripheral device 410, for example, over a network or other connection. The host device 430 can determine whether the updated firmware 431 is different than a version of firmware 411 currently utilized by the peripheral device 410. For example, the host device 430 can store a copy of the firmware 411 or an identification of the version of the firmware 411 currently utilized by the peripheral device 410. The host device 430 can determine whether to install the updated firmware 431 in the peripheral device 410 based on any differences between the firmware 411 currently installed in the peripheral device 410 and the updated firmware 431 or between the corresponding firmware version numbers.

At a block 404, the host device 430 can issue a vendor command 433 to prompt the peripheral device 410 to induce re-enumeration by the host device 430. The peripheral device 410 can provide the indication 422 to the host device 430 that can induce the host device 430 to re-enumerate the peripheral device 410. In some embodiments, the host device 430 can utilize a trigger other than a vendor command to prompt the peripheral device 410 to simulate disconnection and reconnection with the host device 430, or a USB bus error condition. In one embodiment, the trigger may be the successful completion of step 402. In another embodiment, the trigger may be successful initialization of the peripheral device running the new firmware.

In some embodiments, the host device 430 can simulate disconnection and reconnection with the host device 430 or otherwise induce the host to re-enumerate the peripheral device 410, by simulating a bus error. For example, the peripheral device 410 may provide error messages to the host device 430, such as by stopping LUP transmission if the USB 420 is IDLE, as the indication 422. In another embodiment, the peripheral device 410 may provide error messages that stop LGOOD and LCRD transmissions to cause timeout at a link layer of the host or that include a corrupt sequence number on LGOOD, LCRD, or on a header packet, as the indication 422. In still yet another embodiment, the peripheral device 410 can engage in a successful LFPS exit handshake from a low power state (e.g., U1, U2, or U3) to recovery or during the handshake may respond with an improper LFPS, as the indication 422. In still yet another embodiment, the peripheral device 410 may initiate recovery without detecting any error, as the indication 422.

At blocks 406 and 408, the host device 430 can perform a re-enumeration process. During the re-enumeration process, the host device 430 can perform link training with the peripheral device 410, as discussed above in FIG. 2 and FIG. 3, and can re-enumerate the peripheral device 410 having the updated firmware 431. The host device 430 can re-enumerate the peripheral device 410 having installed the updated firmware 431 in response to the indication 422 from the peripheral device 410. Embodiments of the re-enumeration process between a peripheral device and a host device are discussed above with reference to FIG. 2 and FIG. 3. Since the peripheral device 410 can initiate the re-enumeration process through a simulated disconnection or simulated bus error condition, the host device 430 can update firmware of the peripheral device on-the-fly as updates become available for download without a manual disconnection and reconnection of the peripheral device 410 from the host device 430, or other manual intervention.

Figure 5A:
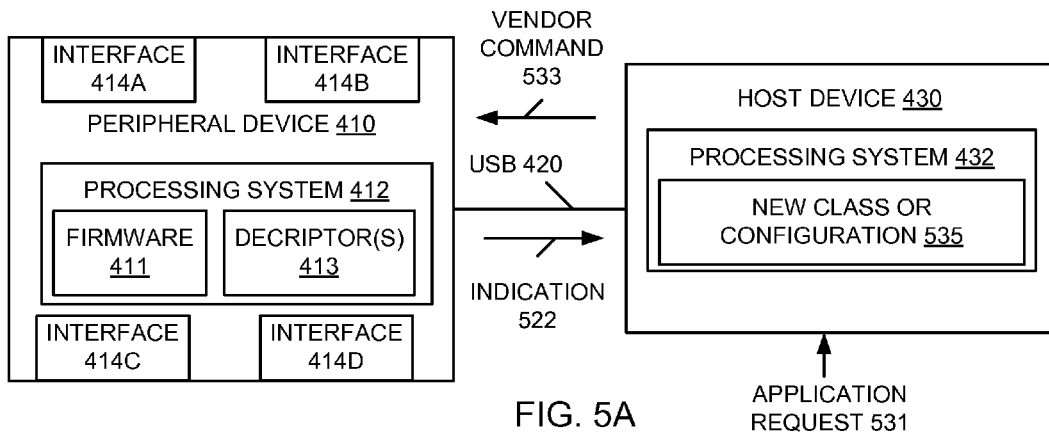
FIG. 5A is block diagram example of a system with a host device selection of a class or configuration for a peripheral device.

FIG. 5A is block diagram example of a system with a host device selection of a class or configuration for the peripheral device 410. Referring to FIG. 5A, the system of FIG. 5A is similar to the system of FIG. 4A with the following differences. The host device 430 can receive an application request 531, for example, from a user application, which can request the peripheral device 410 begin to utilize a new class or configuration 535. In some embodiments, the host device 430 can have knowledge that the peripheral device 410 can implement the new class or configuration 535 from the updated firmware 431 the host device 430 previously provided to the peripheral device 410.

The host device 430 can prompt the peripheral device 410 to change to the new class or configuration 535. In another embodiment, the peripheral device 410 may determine to change configuration independently of any action by the host device 430. In some embodiments, the host device 430 can issue a vendor command 533 over the USB 420 to the peripheral device 410 that identifies the new class or configuration 535 for the peripheral device 410 to implement and prompts the peripheral device 410 to induce the host device 430 to re-enumerate with the peripheral device 410, for example, by sending an indication 522 to the host device 430. Embodiments of the host device selection of the new class or configuration 535 for the peripheral device 410 will be described below with reference to FIG. 5B.

Figure 5B:
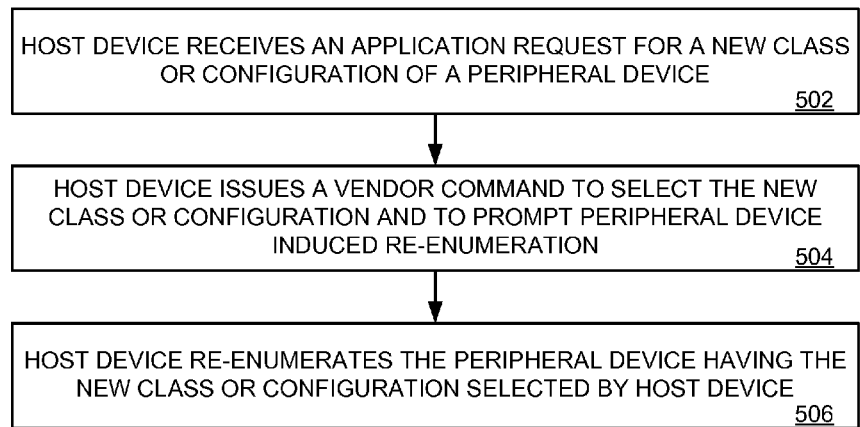
FIG. 5B is an example operational flowchart for re-enumeration by a host device of a peripheral device in order to enable changing of a class or configuration of a peripheral device.

FIG. 5B is an example operational flowchart for re-enumeration by the host device 430 based on a selection of the new class or configuration 535 for the peripheral device 410. Referring to FIG. 5B, at a block 502, the host device 430 can receive the application request 531 for a new class or configuration 535 of the peripheral device 410. The host device 430 can receive the application request 531 from a user application, which can request the peripheral device 410 begin to utilize the new class or configuration 535. In some embodiments, the host device 430 can have knowledge that the peripheral device 410 can implement the new class or configuration 535 from the updated firmware 431 the host device 430 previously provided to the peripheral device 410. Alternatively, a change in class or configuration may be communicated directly to the peripheral device 410, or determined by the peripheral device 410 independently, in which case blocks 502 and 504 may be skipped.

At a block 504, the host device 430 can issue a vendor command 533 to select the new class or configuration 535 and to prompt peripheral device 410 to initiate the re-enumeration process. The vendor command 533 can identify the new class or configuration 535 for the peripheral device 410 to utilize, for example, the vendor command 533 can request the peripheral device 410 support a Mass Storage Class (MSC) or a Modem Class, and/or request the peripheral device 410 support a certain number or types of endpoints.

The peripheral device 410 can provide the indication 522 to the host device 430, such as a simulated disconnection and reconnection to the USB 420 or simulated bus error state on the USB 420, which can initiate re-enumeration by the host device 430 of the peripheral device 410. For example, the peripheral device 410 may provide error messages to the host device 430, such as by stopping LUP transmission if the USB 420 is IDLE, as the indication 522. In another embodiment, the peripheral device 410 may provide error messages that stop LGOOD and LCRD transmissions to cause timeout at a link layer of the host or that include a corrupt sequence number on LGOOD, LCRD, or on a header packet, as the indication 522. In still yet another embodiment, the peripheral device 410 can engage in a successful LFPS exit handshake from a low power state (e.g., U1, U2, or U3) to recovery or during the handshake may respond with an improper LFPS, as the indication 522. In still yet another embodiment, the peripheral device 410 may initiate recovery without detecting any error, as the indication 522.

At a block 506, the host device 430 can re-enumerate the peripheral device 410 with the peripheral device 410 reporting the new class or configuration 535 requested by host device 430 using vendor command 533. In some embodiments, the host device 430 can perform link training with the peripheral device 410, for example, discussed above with reference to FIG. 2 and FIG. 3, prior to re-enumerating the peripheral device 430. Since the peripheral device 410 can initiate the re-enumeration process through a simulated disconnection or simulated bus error, for example, prompted by vendor command 533 from the host device 430, the host device 430 can select the new class or configuration 535 for the peripheral device 410 and re-enumerate the peripheral device 410 to instantiate the selected new class or configuration 535.

Figure 6A:
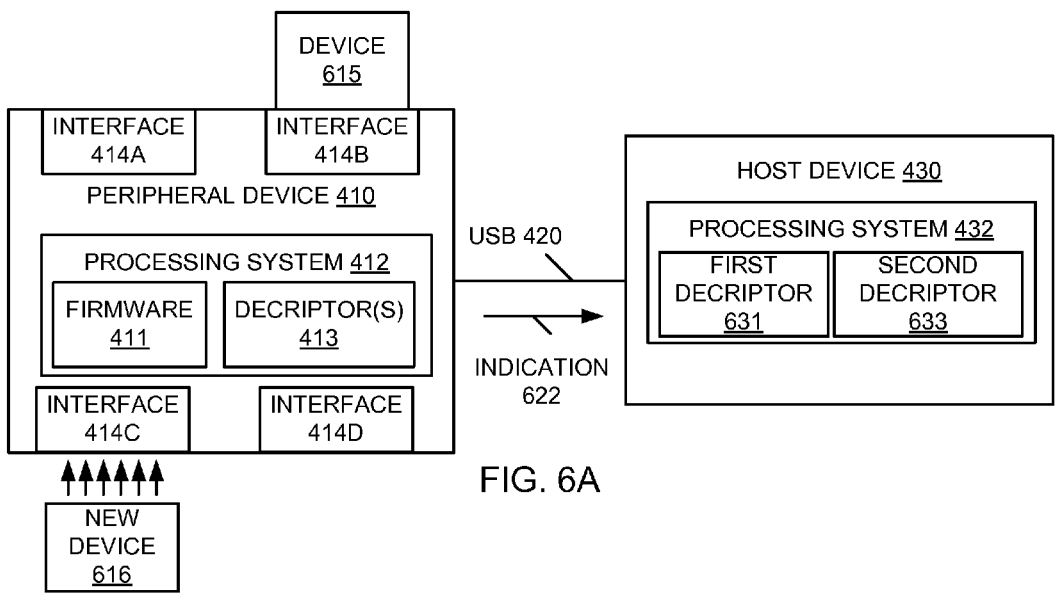
FIG. 6A is block diagram example of a system with a peripheral device having additional port functions.

FIG. 6A is block diagram example of a system with the peripheral device 410 having additional port functions. Referring to FIG. 6A, the system of FIG. 6A is similar to the system of FIG. 4A with the following differences. The peripheral device 410 can include one or more interfaces 414A-414D to couple with various devices, such as storage devices, secured storage devices, modems, display devices, network adapters, etc.

The peripheral device 410 can have a device 615 coupled to interface 414B, and during an initial enumeration of the peripheral device 410 by the host device 430, the peripheral device 410 can provide at least a first descriptor 631 corresponding to the configuration and/or functionality of the device 615. In some embodiments, the interfaces 414A-414D can be hot plug storage ports or ports otherwise capable of properly responding to a change in connection state to dynamically couple with devices after the initial enumeration. After the initial enumeration, a change with at least one of the interfaces 414A-D can occur, such as another one of the interfaces 414A-D can couple with a new device 616, an existing device 615 can be reconfigured, change its state, such as between active and inactive, and/or power on or power off. These changes with the interfaces 414A-D can correspond to a change in corresponding descriptor(s) in the peripheral device 410.

The peripheral device 410 device can detect the presence, activation, or change of state of the new device 616 coupled to interface 414C and initiate the re-enumeration process to pass a at least a second descriptor 633 corresponding at least in part to the configuration and/or functionality of the new device 616 to the host device 430. Embodiments of adding port functionality will be described below with reference to FIG. 6B.

Figure 6B:
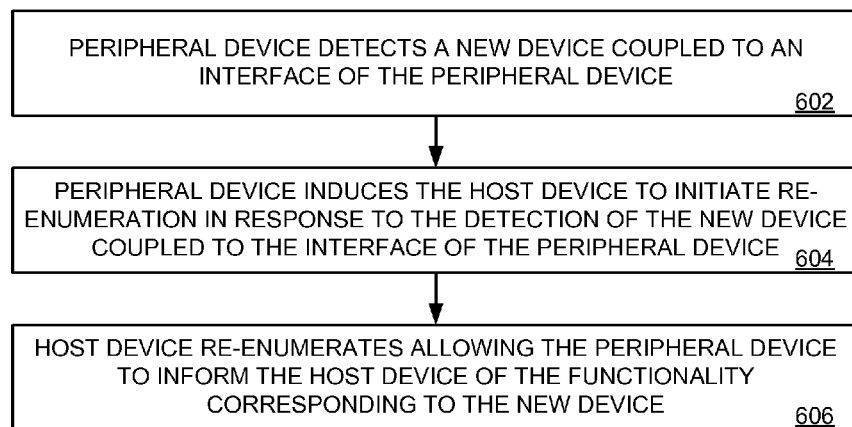
FIG. 6B is an example operational flowchart for re-enumeration by a host device of a peripheral device to allow the peripheral to inform the host device of additional functionality in the peripheral device.

FIG. 6B is an example operational flowchart for re-enumeration by the host device 430 to inform the host device 430 of additional functionality in the peripheral device 410. Referring to FIG. 6B, at a block 602, the peripheral device 410 can detect a new device 616 coupled to one of the interfaces 414A-414D of the peripheral device 410. For example, the interfaces 414A-414D can be hot pluggable storage ports, which can dynamically couple to various devices, such as storage devices, after an initial enumeration between the peripheral device 410 and the host device 430.

At a block 604, the peripheral device 410 can initiate the re-enumeration process in response to the detection of the new device 616 coupled to one of the interfaces 414A-414D of the peripheral device 410. In some embodiments, the peripheral device 410 can provide an indication 622 to the host device 430 that can prompt initiation of the re-enumeration process of the peripheral device 410 by the host device 430. For example, the peripheral device 410 may provide error messages to the host device 430, such as by stopping LUP transmission if the USB 420 is IDLE, as the indication 622. In another embodiment, the peripheral device 410 may provide error messages that stop LGOOD and LCRD transmissions to cause timeout at a link layer of the host or that include a corrupt sequence number on LGOOD, LCRD, or on a header packet, as the indication 622. In still yet another embodiment, the peripheral device 410 can engage in a successful LFPS exit handshake from a low power state (e.g., U1, U2, or U3) to recovery or during the handshake may respond with an improper LFPS, as the indication 622. In still yet another embodiment, the peripheral device 410 may initiate recovery without detecting any error, as the indication 622.

At a block 606, the host device 430 can re-enumerate allowing the peripheral device 410 to inform the host device 430 of the functionality corresponding to the new device 616 coupled to the interface 414A-414D of the peripheral device 410. In some embodiments, the peripheral device 410 can send the host device 430 one or more descriptors, such as second descriptor 633, which can identify the functionality corresponding to the new device 616. The host device 430 can communicate with the new device 616 via the peripheral device 410 based on information in the second descriptor 633. Embodiments of the re-enumeration process between a peripheral device and a host device are discussed above with reference to FIG. 2 and FIG. 3.

Figure 7A:
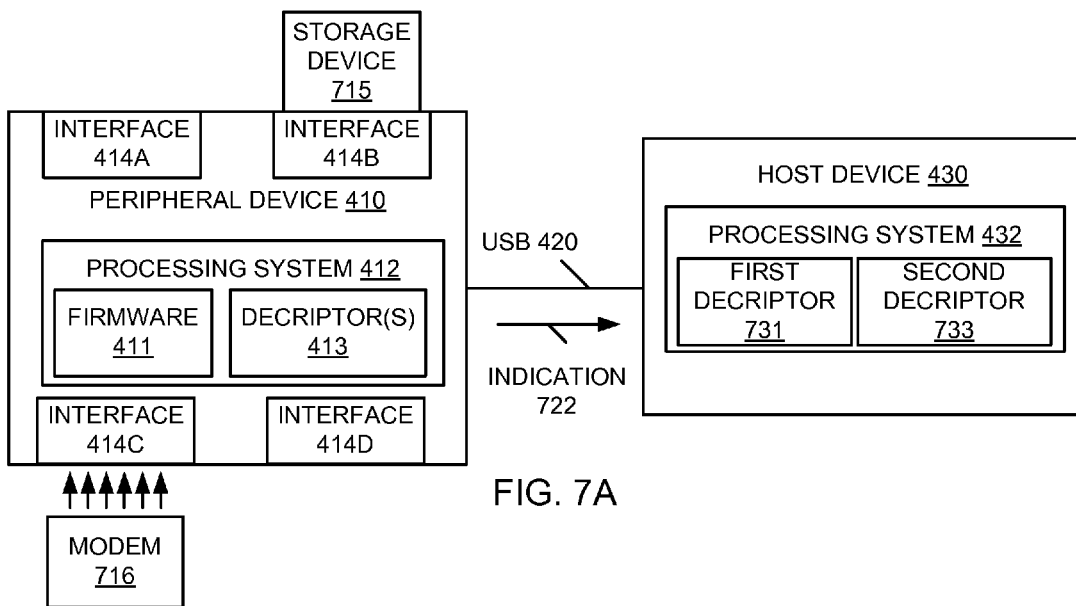
FIG. 7A is block diagram example of a system with a peripheral device initiating a class change.

FIG. 7A is block diagram example of a system with the peripheral device 410 initiating a class change. Referring to FIG. 7A, the system of FIG. 7A is similar to the system of FIG. 4A with the following differences. The peripheral device 410 can include one or more interfaces 414A-414D to couple with various devices, such as storage devices, secured storage devices, modems, etc.

The peripheral device 410 can have a storage device 715 coupled to interface 414B, and during an initial enumeration with the host device 430, the peripheral device 410 can provide a at least a first descriptor 631 corresponding to the configuration and/or functionality of the storage device 715. Since the storage device 715 is coupled to interface 414B, the first descriptor 731 can indicate that the peripheral device 410 can support a Mass Storage Class (MSC). In another embodiment, the peripheral device 410 may indicate that the peripheral device 410 can support another one of the device classes defined in the various USB specifications.

After the initial enumeration, another one of the interfaces 414A-D can couple with or otherwise activate a new device 716, such as interface 414C as shown in FIG. 7A, which can have the peripheral device 410 support a different USB class than the USB class supported for the storage device 715. For example, the new device 716 can be a modem and the peripheral device 410 can support a Modem USB class.

The peripheral device 410 can detect the presence of the new device, such as modem 716, coupled to interface 414C and support the USB class corresponding to the new device. When the peripheral device 410 supports a new USB class in response to the addition of the new device, the peripheral device 410 can initiate the re-enumeration process by the host device 430 to pass a second descriptor 733 during re-enumeration to identify the new USB class supported by the peripheral device 410. In one embodiment, the new USB class may be a second instance of the same USB class. Embodiments of USB class change or addition will be described below with reference to FIG. 7B.

Figure 7B:
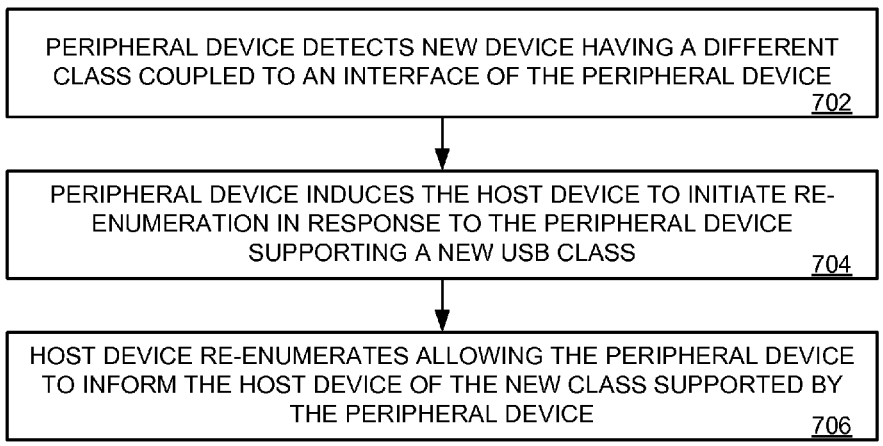
FIG. 7B is an example operational flowchart for re-enumeration by a host device of a peripheral device to allow a peripheral device to initiate a class change.

FIG. 7B is an example operational flowchart for re-enumeration by the host device 430 of the peripheral device 410 based on peripheral device initiated class or configuration change. Referring to FIG. 7B, at a block 702, the peripheral device 410 can detect a new device having a new or different USB class coupled to one of the interfaces 414A-414D of the peripheral device 410. For example, the peripheral device 410 can initially support a Mass Storage Class, but with the addition of a modem 716, the peripheral device 410 can support a Modem USB class in addition to the Mass Storage Class.

At a block 704, the peripheral device 410 can initiate the re-enumeration process by the host device 430 of the peripheral device 410 in response to the peripheral device 410 supporting a new USB class. In some embodiments, the peripheral device 410 can provide an indication 722 to the host device 430 that can prompt initiation of re-enumeration by the host device 430 of the peripheral device 410. For example, the peripheral device 410 may provide error messages to the host device 430, such as by stopping LUP transmission if the USB 420 is IDLE, as the indication 722. In another embodiment, the peripheral device 410 may provide error messages that stop LGOOD and LCRD transmissions to cause timeout at a link layer of the host or that include a corrupt sequence number on LGOOD, LCRD, or on a header packet, as the indication 722. In still yet another embodiment, the peripheral device 410 can engage in a successful LFPS exit handshake from a low power state (e.g., U1, U2, or U3) to recovery or during the handshake may respond with an improper LFPS, as the indication 722. In still yet another embodiment, the peripheral device 410 may initiate recovery without detecting any error, as the indication 722.

At a block 706, the host device 430 can re-enumerate the peripheral device 410, allowing the peripheral device 410 to inform the host device 430 of the new USB class supported by the peripheral device 410. In some embodiments, the peripheral device 410 can send the host device 430 one or more descriptors, such as the second descriptor 733, which can identify the new USB class supported by the peripheral device 410. The host device 430 can communicate with the modem 716 via the peripheral device 410 based on information in the second descriptor 733. Embodiments of the re-enumeration of a peripheral device by a host device are discussed above with reference to FIG. 2 and FIG. 3.

Figure 8A:
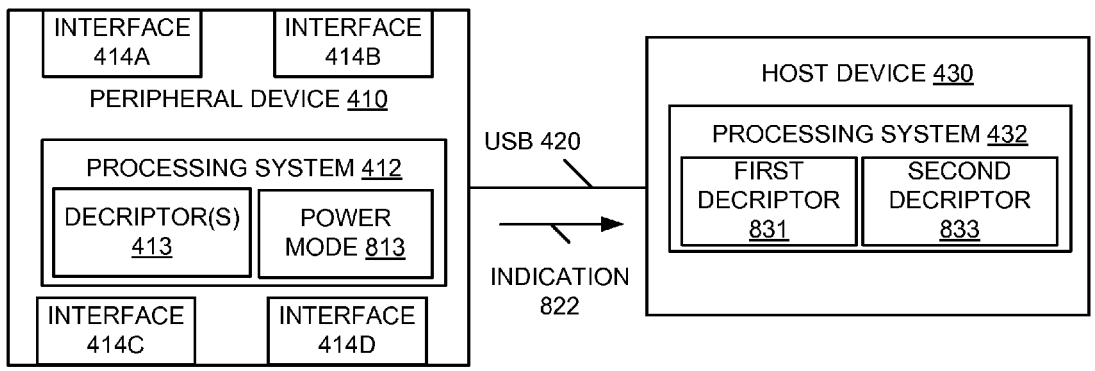
FIG. 8A is block diagram example of a system with a peripheral device initiating a powering change.

FIG. 8A is block diagram example of a system with the peripheral device 410 initiating a power mode change. Referring to FIG. 8A, the system of FIG. 8A is similar to the system of FIG. 4A with the following differences. The processing system 412 of the peripheral device 410 can include a power mode 813, which can be indicative of where the peripheral device 410 receives power. For example, the peripheral device 410 can receive power from the USB 420, which can be a bus-powered mode, or receive power from an internal battery, a plug-in, etc, which can be a self-powered mode.

During an initial enumeration of the peripheral device 410 by the host device 430, the peripheral device 410 can provide the host device 430 a first descriptor 831, which can identify a power mode of the peripheral device 410. The peripheral device 410 can determine to switch power modes after the initial enumeration, and initiate a re-enumeration process to allow the peripheral device 410 to inform the host device 430 of the new power mode of the peripheral device 410.

In some embodiments, the peripheral device 410 may be in a self-powered mode and have a power supply drop below a minimum threshold level, for example, through a drain of a battery or a removal of an external power supply. The peripheral device 410 can detect the power supply drops below the minimum threshold level and determine to switch to a bus-powered mode. In other embodiments, the peripheral device 410 may be in a bus-powered mode, detect that the peripheral device 410 plugs in to an external power source, and determine to switch to a self-powered mode. Embodiments of power mode switch will be described below with reference to FIG. 8B.

Figure 8B:
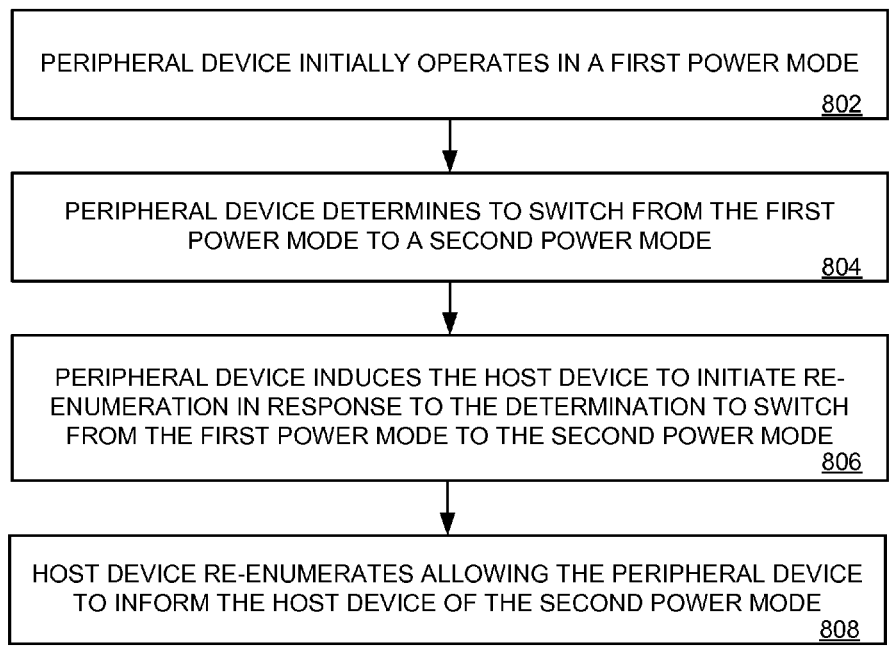
FIG. 8B is an example operational flowchart for re-enumeration by a host device of a peripheral device to allow a peripheral device to initiate a powering change.

FIG. 8B is an example operational flowchart for re-enumeration by the host device 430 based on a peripheral device initiated powering change. Referring to FIG. 8B, at a block 802, the peripheral device 410 can initially operate in a first power mode. The peripheral device 410 can be enumerated by the host device 430 and communicate to the host device 430 a first descriptor 831 that identifies the type of power mode, such as self-powered mode or bus-powered mode, which the peripheral device 410 can currently operate.

At a block 804, the peripheral device 410 can determine to switch from the first power mode to a second power mode. In some embodiments, the peripheral device 410 may be in a self-powered mode and have a power supply drop below a minimum threshold level, for example, through a drain of a battery or a removal of an external power supply. The peripheral device 410 can detect the power supply drops below the minimum threshold level and determine to switch to a bus-powered mode. In other embodiments, the peripheral device 410 may be in a bus-powered mode, detect that the peripheral device 410 plugs in to an external power source, and determine to switch to a self-powered mode.

At a block 806, the peripheral device 410 can induce the host device 430 to initiate re-enumeration in response to the determination to switch from the first power mode to the second power mode. In some embodiments, the peripheral device 410 can provide an indication 822 to the host device 430 that can prompt initiation of re-enumeration by the host device 430 of the peripheral device 410. For example, the peripheral device 410 may provide error messages to the host device 430, such as by stopping LUP transmission if the USB 420 is IDLE, as the indication 822. In another embodiment, the peripheral device 410 may provide error messages that stop LGOOD and LCRD transmissions to cause timeout at a link layer of the host or that include a corrupt sequence number on LGOOD, LCRD, or on a header packet, as the indication 822. In still yet another embodiment, the peripheral device 410 can engage in a successful LFPS exit handshake from a low power state (e.g., U1, U2, or U3) to recovery or during the handshake may respond with an improper LFPS, as the indication 822. In still yet another embodiment, the peripheral device 410 may initiate recovery without detecting any error, as the indication 822.

At a block 808, the host device 430 can re-enumerate the peripheral device 410, allowing the peripheral device 410 to inform the host device 430 that the peripheral device 410 operates in the second power mode. In some embodiments, the peripheral device 410 can send the host device 430 one or more descriptors, such as the second descriptor 833, which can identify the power mode of the peripheral device 410. Embodiments of the re-enumeration process between a peripheral device and a host device are discussed above with reference to FIG. 2 and FIG. 3.

Figure 9A:
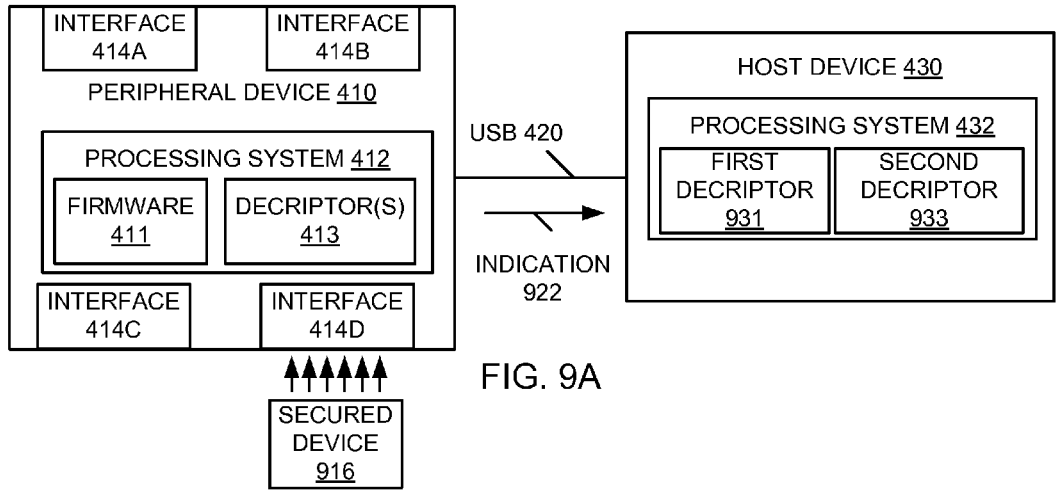
FIG. 9A is block diagram example of a peripheral device coupling to a secured device.

FIG. 9A is block diagram example of the peripheral device 410 coupling to a secured device 916. Referring to FIG. 9A, the system of FIG. 9A is similar to the system of FIG. 4A with the following differences. The peripheral device 410 can include multiple interfaces 414A-414D to couple with various devices, such as storage devices, secured storage devices, modems, etc.

The peripheral device 410 can have a secured device 916 coupled to interface 414D, and during an initial enumeration by the host device 430, the peripheral device 410 can provide a first descriptor 931 corresponding to the configuration and/or functionality of the secured device 916. The first descriptor 931 can identify the secured device 916, for example, as a read-only memory, such as a compact-disc (CD) or NAND flash drive. The peripheral device 410 can also include an auto-run utility, executable by the host device 430, to authenticate the host device 430 for access to the secured device 916.

The host device 430 can execute the auto-run utility and send at least one vendor command to the peripheral device 410 with authentication information. The peripheral device 410 can authenticate the host device 430 based on the at least one vendor command received from the host device 430.

After the host device 430 has been authenticated to access the secured device 916, the peripheral device 410 can initiate re-enumeration by the host device 430 to pass a second descriptor 933 during re-enumeration to identify a functionality of the secured device 916 and the USB class of the peripheral device 410 to support the functionality of the secured device 916. For example, when the secured device 916 is a secured storage device, the second descriptor 933 can identify the secured device 916 as a secured storage device and identify that the peripheral device 410 operates a Mass Storage Class to support the secured storage device. Embodiments of re-enumeration in response to authentication for secured device 916 will be described below with reference to FIG. 9B.

Figure 9B:
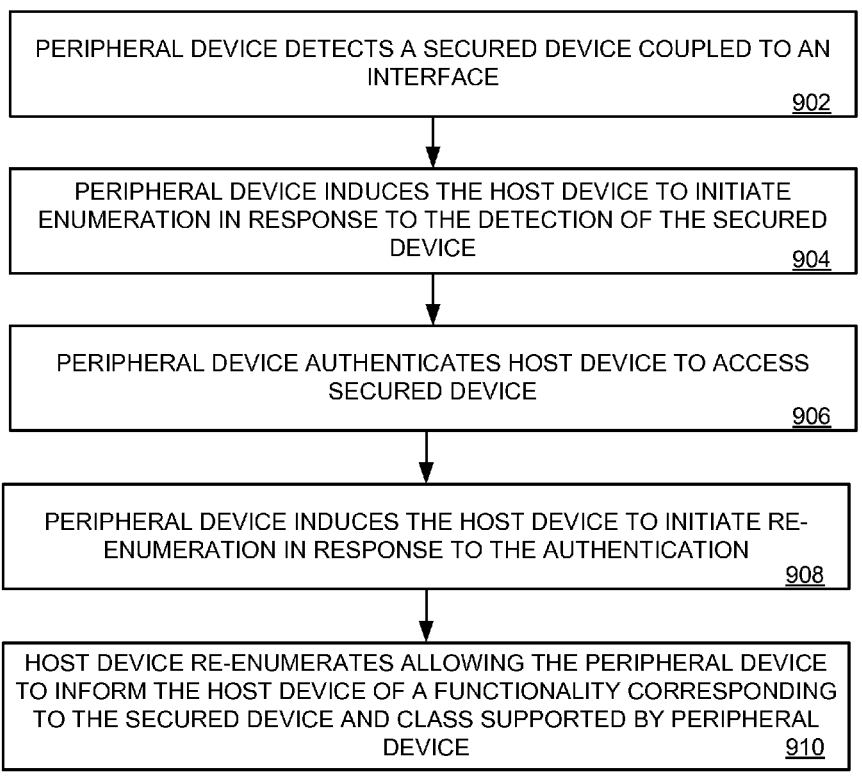
FIG. 9B is an example operational flowchart for re-enumeration by a host device of a peripheral device in response to authentication for secured device.

FIG. 9B is an example operational flowchart for re-enumeration between the host device 430 and the peripheral device 410 in response to authentication for secured device 916. Referring to FIG. 9B, at a block 902, the peripheral device 410 can detect a secured device 916 coupled to one of the interfaces 414A-414D, such as interface 414D.

At a block 904, the host device 430 can enumerate with the peripheral device 430, allowing the peripheral device 410 to provide the host device 430 a first descriptor 931 that identifies the secured device 916, for example, as a read-only memory, such as a compact-disc (CD) or NAND flash drive. The peripheral device 410 can also include an auto-run utility, executable by the host device 430, to authenticate the host device 430 for access to the secured device 916.

At a block 906, the peripheral device 410 can authenticate the host device 430 to access the secured device 916. In some embodiments, the host device 430 can execute the auto-run utility and send vendor commands to the peripheral device 410 that include information allowing the peripheral device 410 to determine whether to authenticate the host device 430 to access the secured device 916.

At a block 908, the peripheral device 410 can initiate a re-enumeration process by the host device 430 in response to the authentication of the host device 430. In some embodiments, the peripheral device 410 can provide an indication 922 to the host device 430 that can prompt initiation of re-enumeration by the host device 430 of the peripheral device 410. For example, the peripheral device 410 may provide error messages to the host device 430, such as by stopping LUP transmission if the USB 420 is IDLE, as the indication 922. In another embodiment, the peripheral device 410 may provide error messages that stop LGOOD and LCRD transmissions to cause timeout at a link layer of the host or that include a corrupt sequence number on LGOOD, LCRD, or on a header packet, as the indication 922. In still yet another embodiment, the peripheral device 410 can engage in a successful LFPS exit handshake from a low power state (e.g., U1, U2, or U3) to recovery or during the handshake may respond with an improper LFPS, as the indication 922. In still yet another embodiment, the peripheral device 410 may initiate recovery without detecting any error, as the indication 922.

At a block 910, the host device 430 can re-enumerate with the peripheral device 410, allowing the peripheral device 410 to inform the host device 430 of the functionality of the secured device 916, which can be different than a CD-read-only memory, and to inform the host device 430 of the USB class supported by the peripheral device 410. In some embodiments, the peripheral device 410 can send the host device 430 one or more descriptors, such as the second descriptor 833, which can identify both the functionality of the secured device 916 and the USB class supported by the peripheral device 410. Embodiments of the re-enumeration process by a host device are discussed above with reference to FIG. 2 and FIG. 3.

In some embodiments, the secured device 916 can be a secured storage device. During re-enumeration, the peripheral device 410 can inform the host device 430 that the secured storage device is a storage port and that the peripheral device 410 operates in a Mass Storage Class to support the secured storage port.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
a peripheral device operating in a first power mode, the peripheral device being enumerated by a host device over a Universal Serial Bus (USB) 3.0 compatible bus and in an active (U0) state;
the peripheral device determining to switch from the first power mode to a second power mode;
the peripheral device sending a USB 3.0 compatible message to induce the host device to initiate re-enumeration in response to determining to switch from the first power mode to the second power mode, wherein:
inducing the host device to initiate the re-enumeration comprises sending an indication that causes the host device to enter an RX.Detect mode followed by return to the active (U0) state, and
wherein the indication is of a simulated condition of a device that is not a current condition of the device; and
the peripheral device informing the host device, as part of the re-enumeration, that the peripheral device operates in the second power mode.

2. The method of claim 1, wherein the first power mode is a self-powered mode and the second power mode is a bus-powered mode.

3. The method of claim 1, wherein the first power mode is a bus-powered mode and the second power mode is a self-powered mode.

4. The method of claim 1, wherein the peripheral device determining to switch from the first power mode to the second power mode comprises detecting that a power supply for the peripheral device has dropped below a minimum threshold level.

5. The method of claim 1, wherein the peripheral device determining to switch from the first power mode to the second power mode comprises detecting that the peripheral device has been plugged into an external power source.

6. The method of claim 1, wherein the indication is an error message that specifies one of: stopping of LUP transmission; stopping of LGOOD and LCRD transmissions; and a corrupt sequence number on one of a LGOOD, LCRD, and a header packet.

7. The method of claim 1, wherein the indication specifies a successful LFPS exit handshake from a lower power state.

8. The method of claim 1, wherein the indication specifies an improper LFPS during an exit handshake from a low power state.

9. The method of claim 1, wherein the peripheral device informing the host device that peripheral device operates in the second power mode comprises sending a descriptor identifying the second power mode as part of the re-enumeration.

10. A peripheral device comprising:
a memory device;
a processor coupled to the memory device and configured to communicate over a Universal Serial Bus (USB) 3.0 compatible bus, the processor further configured to:
operate in a first power mode after being enumerated by a host device and in an active (U0) state;
determine to switch from the first power mode to a second power mode;
send a USB 3.0 compatible message to induce the host device to initiate re-enumeration in response to determining to switch from the first power mode to the second power mode, wherein:
the USB 3.0 compatible message comprises an indication that causes the host device to enter an RX.Detect mode followed by a return to the active (U0) state, and
wherein the indication is of a simulated condition of the peripheral device that is not the current condition of the peripheral device; and
inform the host device about the second power mode as part of the re-enumeration.

11. The peripheral device of claim 10, wherein the first power mode is a self-powered mode and the second power mode is a bus-powered mode.

12. The peripheral device of claim 10, wherein the first power mode is a bus-powered mode and the second power mode is a self-powered mode.

13. The peripheral device of claim 10, wherein in order to determine to switch to the second power mode, the processor is further configured to detect that a power supply for the peripheral device has dropped below a minimum threshold level.

14. The peripheral device of claim 10, wherein in order to determine to switch to the second power mode, the processor is further configured to detect that the peripheral device has been plugged into an external power source.

15. The peripheral device of claim 10, wherein the indication is an error message that specifies one of:
stopping of LUP transmission;
stopping of LGOOD and LCRD transmissions; and
a corrupt sequence number on one of a LGOOD, LCRD, and a header packet.

16. The peripheral device of claim 10, wherein the indication specifies a successful LFPS exit handshake from a lower power state.

17. The peripheral device of claim 10, wherein the indication specifies an improper LFPS during an exit handshake from a low power state.

18. The peripheral device of claim 10, wherein in order to inform the host device about the second power mode, the processor is further configured to send a descriptor identifying the second power mode as part of the re-enumeration.

* * * * *